United States Patent
Lee et al.

(10) Patent No.: US 9,755,231 B2
(45) Date of Patent: Sep. 5, 2017

(54) METHOD OF PREPARING IRON OXIDE NANOPARTICLES

(71) Applicant: LG Chem, Ltd., Seoul (KR)

(72) Inventors: Myung Ki Lee, Daejeon (KR); Sung Bin Park, Daejeon (KR); Sung Joong Kang, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 405 days.

(21) Appl. No.: 14/248,479

(22) Filed: Apr. 9, 2014

(65) Prior Publication Data

US 2014/0220444 A1    Aug. 7, 2014

Related U.S. Application Data

(63) Continuation of application No. PCT/KR2014/000721, filed on Jan. 24, 2014.

(30) Foreign Application Priority Data

Jan. 25, 2013 (KR) .................. 10-2013-0008784

(51) Int. Cl.
| | |
|---|---|
| H01M 4/52 | (2010.01) |
| H01M 4/24 | (2006.01) |
| C01G 49/06 | (2006.01) |
| H01M 4/62 | (2006.01) |
| H01M 4/02 | (2006.01) |

(52) U.S. Cl.
CPC ............ H01M 4/521 (2013.01); C01G 49/06 (2013.01); H01M 4/248 (2013.01); *C01P 2004/03* (2013.01); *C01P 2004/30* (2013.01); *C01P 2004/62* (2013.01); *C01P 2006/40* (2013.01); *H01M 4/523* (2013.01); *H01M 4/622* (2013.01); *H01M 4/625* (2013.01); *H01M 2004/021* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 6,599,234 B1 * | 7/2003 | Gray ...................... | A61K 33/24 600/12 |
| 2008/0181843 A1 * | 7/2008 | Lu .......................... | B01J 23/745 423/634 |
| 2012/0214063 A1 | 8/2012 | Morimoto et al. | |

FOREIGN PATENT DOCUMENTS

| | | |
|---|---|---|
| CN | 102598367 A | 7/2012 |
| CN | 103043726 A | 4/2013 |
| JP | 08081638 | 3/1996 |
| JP | 2008-103094 A | 5/2008 |
| JP | 2008204777 A | 9/2008 |

(Continued)

OTHER PUBLICATIONS

Sugimoto, "Systematic control of size, shape and internal structure of monodisperse $\alpha$-Fe2O3 particles", Mar. 17, 1997.*

(Continued)

*Primary Examiner* — Barbara Gilliam
*Assistant Examiner* — Nathanael Zemui
(74) *Attorney, Agent, or Firm* — Lerner, David, Littenberg, Krumholz & Mentlik, LLP

(57) ABSTRACT

Provided are a method of preparing iron oxide nanoparticles, iron oxide nanoparticles prepared thereby, and an anode material including the iron oxide nanoparticles.

2 Claims, 2 Drawing Sheets

(56) References Cited

FOREIGN PATENT DOCUMENTS

| JP | 2008262829 | A | 10/2008 |
|---|---|---|---|
| KR | 20050112692 | A | 12/2005 |
| KR | 100638104 | B1 | 10/2006 |
| KR | 100974083 | B1 | 8/2010 |
| KR | 20100124172 | A | 11/2010 |

OTHER PUBLICATIONS

Tadao Sugimoto, Mohammad M. Khan, Atsushi Muramatsu, Hiroyuki Itoh, "Formation mechanism of monodisperse peanut-type α-Fe2O3 particles from condensed ferric hydroxide gel", Colloids and Surfaces A: Physicochemical and Engineering Aspects vol. 79, Issues 2-3, Nov. 12, 1993, pp. 233-247.*

Tadao Sugimoto, Mohammad M. Khan, Atsushi Muramatsu, "Preparation of monodisperse peanut-type α-Fe2O3 particles from condensed ferric hydroxide gel", Colloids and Surfaces A: Physicochemical and Engineering Aspects, vol. 70, Issue 2, Mar. 17, 1993, pp. 167-169.*

Material Safety Data Sheet Sodium Hydroxide, 50% MSDS.*

Material Safety Data Sheet Sodium Sulfate, 22.2% (w/v) solution MSDS.*

Tadao Sugimoto et al: "Preparation of monodisperse peanut-type a-Fe2O3, particles from condensed ferric hydroxide gel", Colloids and Surfaces A: Physicochemical and Engineering Aspects, vol. 70, Mar. 17, 1993, p. 167-169, XP055216402.

Maiyong Zhu et al: "Hydrothermal Synthesis of Hematite Nanoparticles and Their Electrochemical Properties", Journal of Physical Chemistry C, vol. 116, No. 30, Aug. 2, 2012, p. 16276-16285, XP055216410.

Extended Search Report from European Application No. 14743358.5, dated Oct. 9, 2015.

* cited by examiner

METHOD OF PREPARING IRON OXIDE NANOPARTICLES

CROSS-REFERENCE TO RELATED APPLICATIONS

The present application is a continuation of International Application No. PCT/KR2014/000721 filed on Jan. 24, 2014, which claims the benefit of Korean Patent Application No. 10-2013-0008784, filed on Jan. 25, 2013, the disclosures of which are incorporated herein by reference.

BACKGROUND OF THE INVENTION

Field of the Invention

The present invention relates to a method of preparing iron oxide nanoparticles, and more particularly, to a method of preparing iron oxide nanoparticles, iron oxide nanoparticles prepared thereby, and an anode material including the iron oxide nanoparticles.

Description of the Related Art

Recently, as issues, such as the depletion of fossil fuels and environmental destruction, have emerged, many researchers have devoted to develop alternative energies that may replace fossil fuels. As a kind of such alternative energies, a significant amount of research into secondary batteries that are applicable to various fields has been conducted.

The application fields of secondary batteries have been further expanded to batteries for vehicles and batteries for power storage as well as typical portable systems.

A secondary battery may be composed of a cathode, an anode, an electrolyte solution, and a separator, and among these, components that mostly affect the battery may be the cathode and the anode in which electrochemical reactions actually occur.

A graphite material has mainly been used as the anode due to its competitiveness in terms of stability, lifetime, and price. However, as high-capacity batteries, which may be used in electric vehicles and batteries for power storage, have been increasingly required, research into developing a new anode material having high theoretical capacity has emerged.

In line with such requirements, metal oxides have recently received attention as a high-capacity anode active material, and particularly, iron (III) oxide ($Fe_2O_3$) among these oxides has received attention as an anode material due to its high theoretical capacity (1007 mAh/g).

However, since capacity and cycle efficiency may decrease during a charge/discharge process when a particle diameter of the metal oxide is large (>1 μm), research into preparing nanometer-sized iron oxide particles by various chemical syntheses has continued.

As a synthesis method of the iron oxide nanoparticles, a method has been known, in which a ferrous hydroxide ($Fe(OH)_2$) aqueous solution, which is prepared by adding sodium hydroxide to a ferric salt aqueous solution, is irradiated with ultrasonic waves.

However, with respect to a typical synthesis method of iron oxide, difficult synthesis conditions (inert atmosphere) must be maintained and an expensive high purity raw material must be used. In addition, since the particles obtained by the irradiation of ultrasonic waves may not be uniform and may have poor crystallinity, the application range thereof may be narrow. Also, since it takes a long time to irradiate with ultrasonic waves, mass production may be impossible.

Furthermore, since iron (III) oxide nanoparticles prepared by a typical method may be difficult to be prepared as nanoparticles having a fine and uniform particle size, cracks may occur in an electrode due to volume expansion and shrinkage of the electrode during a charge/discharge process. Thus, capacity loss is high and cycle efficiency rapidly decreases.

Therefore, development of a method of preparing iron oxide nanoparticles is urgent, in which limitations of a typical preparation method of iron oxide nanoparticles, such as complex process and long preparation time, may be addressed, particle diameter and shape of powder may be uniformly controlled, and simultaneously, capacity loss may be low even during numerous charge/discharge processes.

SUMMARY OF THE INVENTION

An aspect of the present invention provides a method of preparing iron oxide nanoparticles, in which mass production may be possible by a simple process condition and capacity loss may be low even during numerous charge/discharge processes.

Another aspect of the present invention provides iron oxide nanoparticles prepared by the above method and an anode material including the iron oxide nanoparticles.

Another aspect of the present invention provides an anode for an electrochemical device that is formed of the above anode material and an electrochemical device including the anode.

According to an aspect of the present invention, there is provided a method of preparing iron (III) oxide nanoparticles including: preparing a ferric chloride ($FeCl_3$) aqueous solution; preparing a sodium hydroxide (NaOH) aqueous solution; mixing both aqueous solutions; adding a sodium sulfate ($Na_2SO_4$) aqueous solution while stirring a mixed aqueous solution prepared by the mixing; and reacting the mixed aqueous solution having the sodium sulfate aqueous solution added thereto in an electric convection oven.

According to a method of the present invention, iron oxide nanoparticles may be prepared in which particle diameter and particle distribution of the powder may be controlled by a simple preparation process and capacity loss may be low even during numerous charge/discharge processes. Also, an anode having excellent capacity and stability, and an electrochemical device including the anode may be prepared by using the iron oxide nanoparticles.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION OF THE PREFERRED EMBODIMENT

Figure 1:
FIGS. 1 and 2 are scanning electron microscope (SEM) images of iron oxide nanoparticles prepared by a method of the present invention.

Hereinafter, the present invention will be described in detail.

The present invention provides a method of preparing iron (III) oxide nanoparticles including: preparing a ferric chloride (FeCl$_3$) aqueous solution; preparing a sodium hydroxide (NaOH) aqueous solution; mixing both aqueous solutions; adding a sodium sulfate (Na$_2$SO$_4$) aqueous solution while stirring a mixed aqueous solution prepared by the mixing; and reacting the mixed aqueous solution having the sodium sulfate aqueous solution added thereto in an electric convection oven.

Specifically, in the method of the present invention, a concentration of the FeCl$_3$ aqueous solution may be in a range of 2 M to 3 M and a concentration of the NaOH aqueous solution may be in a range of 5 M to 6 M. Also, a concentration of the Na$_2$SO$_4$ aqueous solution may be in a range of 0.5 M to 1 M, and for example, may be 0.6 M.

In this case, when the concentration of the FeCl$_3$ aqueous solution is 2 M or less or 3 M or more, metal oxide having a particle diameter of 1 μm or more may be synthesized. Also, when the concentration of the NaOH aqueous solution is 6 M or more, a pH level of the synthesized aqueous solution may be increased and thus, metal oxide may not be synthesized. Furthermore, when the concentration of the Na$_2$SO$_4$ aqueous solution is 1M or more, metal oxide having a uniform shape may not be prepared. In this case, a sodium phosphate (Na$_2$PO$_4$) aqueous solution may be used instead of the Na$_2$SO$_4$ aqueous solution.

In the method of the present invention, the ferric chloride aqueous solution, the sodium hydroxide aqueous solution, and the sodium sulfate aqueous solution may be mixed in a volume ratio of 10:9:x (where x satisfies 0<x<1).

In this case, when the volume ratio of the ferric chloride aqueous solution to the sodium hydroxide aqueous solution is outside the above range, metal oxide may not be prepared. Also, when the volume ratio of the sodium sulfate aqueous solution is greater than 1, this may act as a factor that may change the shape of the metal oxide, and thus, particles having a very small diameter may be prepared.

Furthermore, the reacting may be performed in a temperature range of 100° C. to 105° C., and may be performed at a temperature of 102° C. for 90 hours to 150 hours at atmospheric pressure, for example, about 90 hours to 100 hours. The method of the present invention may further include cooling a solid product obtained after the completion of the reaction, and then washing and drying the solid product. In this case, the washing may be sequentially performed using water and ethanol.

Also, the present invention may provide iron oxide nanoparticles in which particle diameter and particle shape are uniformly controlled by the method of the present invention.

Specifically, the particle size (diameter) of the iron oxide nanoparticles thus obtained may be in a range of 500 nm to 1 μm. In a case where the particle diameter of the iron oxide nanoparticles is further decreased to less than 500 nm or is greater than 1 μm, capacity retention ratio and cycle efficiency may be rapidly decreased during a charge and discharge process.

Also, the particle shape of the iron oxide nanoparticles may be roughly round oval.

As described above, according to the present invention, iron oxide nanoparticles may be prepared, in which the particle diameter and particle shape are controlled only by the simple preparation process, and a secondary battery with low capacity loss even during the numerous charge/discharge processes may be prepared using the iron oxide nanoparticles.

That is, with respect to typical iron oxide nanoparticles, capacity may decrease and exfoliation of an electrode may occur due to volume expansion during a charge and discharge process. However, in the present invention, iron oxide particles having a very small diameter (a few nm) may form oval-shaped particles having a diameter of 1 μm or less, and at this time, tiny spaces in the particles may act as a buffer for the volume expansion of individual metal oxide particles having a diameter of a few nm (see FIG. 1). Therefore, typical limitations, such as the decrease in capacity during the charge and discharge process and the exfoliation of the electrode, may be improved.

Also, the present invention may provide an anode material including the iron oxide nanoparticles.

In this case, the anode material may further selectively include a conductive agent, a binder, or a filler, in addition to the iron oxide nanoparticles.

The iron oxide nanoparticles may be added in an amount of 40 wt % to 65 wt % based on a total weight of the anode material. In the case that the amount of the iron oxide nanoparticles is 40 wt % or less, high capacity may not be achieved. In the case in which the amount of the iron oxide nanoparticles is 65 wt % or more, cycle stability may not be realized due to the limitation that the exfoliation of the electrode may occur in an initial second cycle.

Furthermore, the conductive agent may be typically added in an amount ranging from 1 wt % to 30 wt % based on the total weight of the anode material. The conductive agent is not particularly limited so long as it does not generate chemical changes in the battery as well as having conductivity. Examples of the conductive agent may be graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder and nickel powder; conductive whiskers such as zinc oxide whiskers and potassium titanate whiskers; conductive metal oxide such as titanium oxide; a conductive material such as a polyphenylene derivative, etc.

The binder is a component that assists in bonding between the iron oxide nanoparticles and the conductive agent and bonding with respect to a current collector, and the binder may be typically added in an amount ranging from 1 wt % to 30 wt % based on the total weight of the anode material. Examples of the binder may be polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, etc.

The filler is selectively used as a component that prevents the expansion of the electrode and is not particularly limited so long as it does not generate chemical changes in the battery as well as being a fibrous material. Examples of the filler may be olefin-based polymers such as polyethylene and polypropylene; and fibrous materials such as glass fibers and carbon fibers.

Also, the present invention may provide an anode for an electrochemical device in which the current collector is coated with the anode material.

For example, a slurry is prepared by dissolving the anode material of the present invention in a solvent, an anode current collector is coated with the slurry, and the anode may then be prepared by drying and rolling the anode current collector.

The anode current collector is not particularly limited so long as it does not generate chemical changes in the battery as well as having conductivity. Examples of the anode current collector may be at least any one selected from the group consisting of stainless steel, nickel, copper, titanium, and an alloy thereof. In general, the anode current collector may have a thickness of 3 μm to 500 μm.

Also, the present invention may provide an electrochemical device composed of the anode including the anode material, a cathode, a separator, and a non-aqueous electrolyte solution.

The electrochemical device may be a lithium secondary battery.

In this case, the electrochemical device may be prepared by a typical method.

EXAMPLES

Hereinafter, the present invention will be described in detail, according to examples and comparative examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

Example 1

1-1. Preparation of Iron Oxide Nanoparticles

A 2 M ferric chloride ($FeCl_3$) aqueous solution, a 6 M sodium hydroxide (NaOH) aqueous solution, and a 0.6 M sodium sulfate ($Na_2SO_4$) aqueous solution were introduced into a reactor at a volume ratio of 10:9:1, and the aqueous solutions were then uniformly mixed using an impeller. The mixed solution was put in an electric convection oven at 102° C. and reacted for 96 hours to obtain a solid product.

Figure 2:
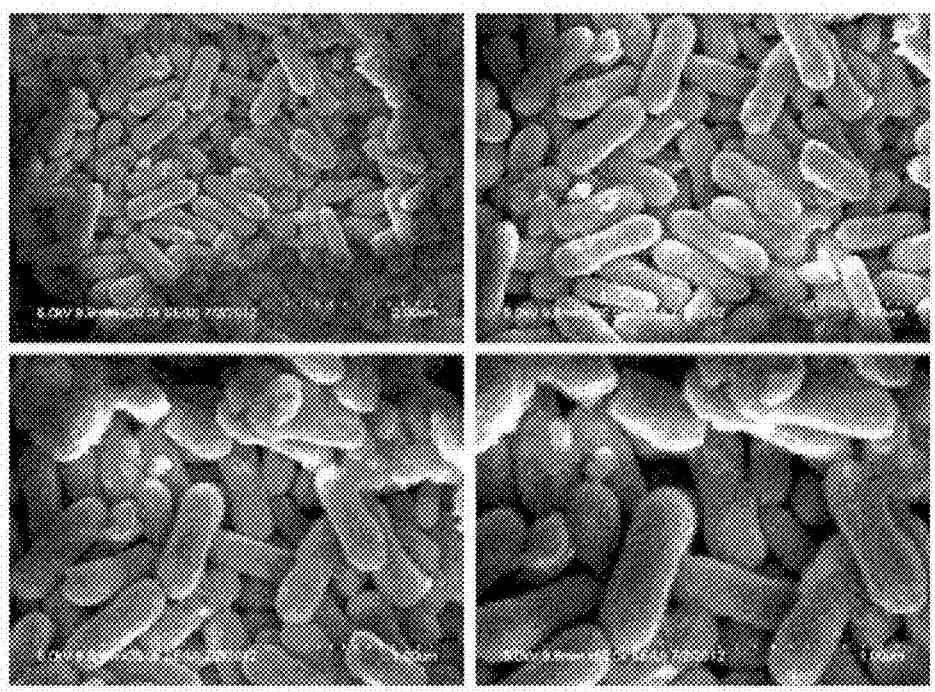

The solid product was cooled, and then sequentially washed using water and ethanol. Thereafter, iron oxide nanoparticles (particle diameter: 500 nm) were obtained by drying the product in a vacuum drier (see FIG. 2).

1-2. Preparation of Battery

The iron oxide nanoparticles prepared above, a conductive agent (Super P), and a binder (KF 1100) were mixed at a weight ratio of 65:10:25 to prepare a slurry. A copper current collector was coated with the slurry and then dried in a vacuum oven at 120° C. for 12 hours or more.

A lithium metal was used as a counter electrode, and 1 M $LiPF_6$/ethylene carbonate (EC):ethyl methyl carbonate (EMC) (volume ratio 1:1) was used as an electrolyte to prepare a coin-type half cell.

Example 2

The iron oxide nanoparticles prepared in Example 1-1, a conductive agent (Super P), and a binder (KF 1100) were mixed at a weight ratio of 40:30:30 to prepare a slurry. A copper current collector was coated with the slurry and then dried in a vacuum oven at 120° C. for 12 hours or more.

A lithium metal was used as a counter electrode, and 1 M $LiPF_6$/ethylene carbonate (EC):ethyl methyl carbonate (EMC) (volume ratio 1:1) was used as an electrolyte to prepare a coin-type half cell.

Comparative Example 1

50 nm iron oxide nanoparticles prepared by a typical method, a conductive agent (Super P), and a binder (KF 1100) were mixed at a weight ratio of 65:10:25 to prepare a slurry. A copper current collector was coated with the slurry and then dried in a vacuum oven at 120° C. for 12 hours or more.

A lithium metal was used as a counter electrode, and 1 M $LiPF_6$/ethylene carbonate (EC):ethyl methyl carbonate (EMC) (volume ratio 1:1) was used as an electrolyte to prepare a coin-type half cell.

Experiment 1

Figure 3:
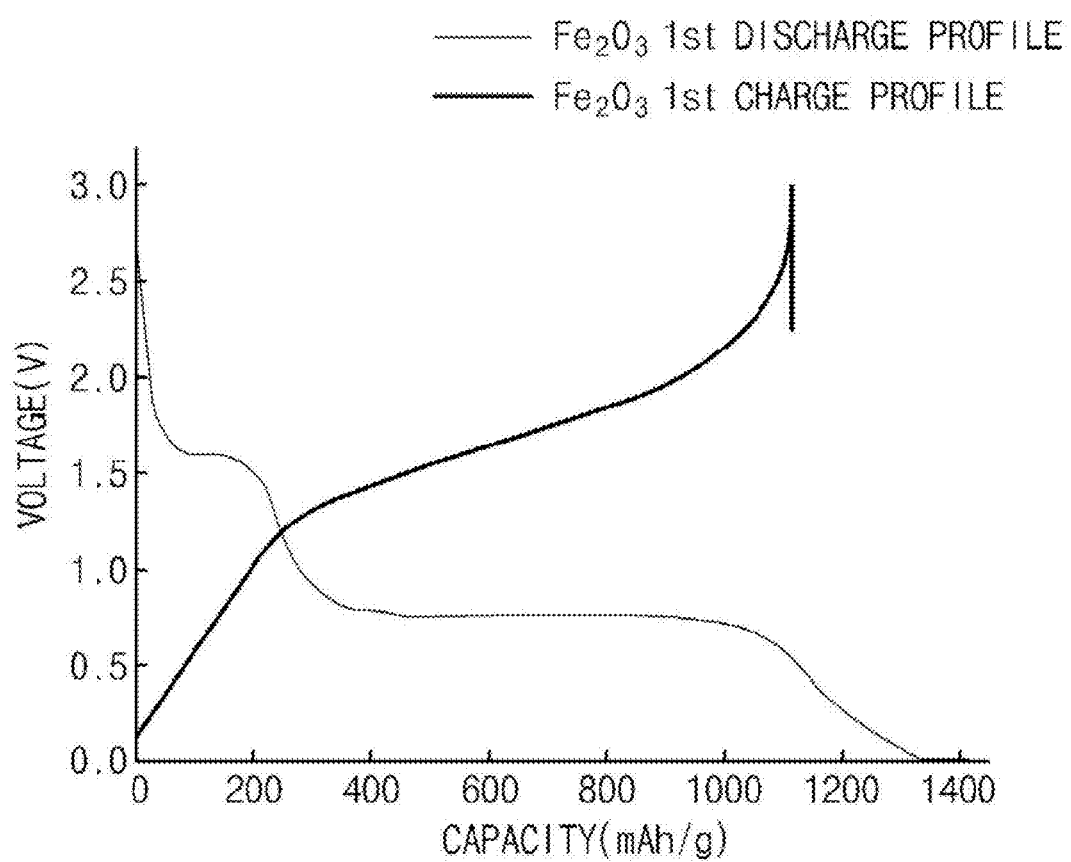
FIG. 3 is a graph comparing the results of the measurement of capacities of secondary batteries prepared in Example 1 and Comparative Example 1.

Performance of the secondary batteries prepared in Example 1, Example 2, and Comparative Example 1 were evaluated as follows: The batteries were charged and discharged in a charge and discharge range of 2.0V to 0.005V (vs. $Li/Li^+$) for 10 cycles, and at this time, current density was 0.1 C. The results of initial charge and discharge efficiencies of the secondary batteries are presented in Table 1 below. Also, the results of charge and discharge using the battery of Example 2 are presented in a graph of FIG. 3.

TABLE 1

|  |  | Example 1 | Example 2 | Example 3 |
|---|---|---|---|---|
| $1^{st}$ cycle | Discharge capacity | 1318 mAh/g | 1460 mAh/g | 1481 mAh/g |
|  | Charge capacity | 1008 mAh/g | 1027 mAh/g | 750 mAh/g |
| $2^{nd}$ cycle | Discharge capacity | 1004 mAh/g | 1044 mAh/g | 841 mAh/g |
|  | Charge capacity | 963 mAh/g | 993 mAh/g | 312 mAh/g |
| $10^{th}$ cycle capacity |  | 904 mAh/g | 894 mAh/g | 62 mAh/g |
| Capacity retention ratio |  | 93.8% | 92.3% | 19.9% |

As illustrated in Table 1, it may be confirmed that the batteries prepared in Examples 1 and 2 maintained a capacity retention ratio of 90% or more even after the $10^{th}$ cycle, but the capacity retention ratio of the battery of Comparative Example 1 prepared using the 50 nm iron oxide nanoparticles was rapidly decreased after the $10^{th}$ cycle.

What is claimed is:

1. A method of preparing oval shaped iron (III) oxide nanoparticles, the method comprising:
   preparing a ferric chloride ($FeCl_3$) aqueous solution;
   preparing a sodium hydroxide (NaOH) aqueous solution;
   obtaining a mixed aqueous solution consisting of the ferric chloride ($FeCl_3$) aqueous solution, the sodium hydroxide (NaOH) aqueous solution, and a sodium sulfate ($Na_2SO_4$) aqueous solution;
   reacting the mixed aqueous solution in an electric convection oven in a temperature range of 100° C. to 105° C. for 90 hours to 100 hours at atmospheric pressure to get a solid product; and
   cooling, washing, and drying the solid product to get a dried product,
   wherein a concentration of the $FeCl_3$ aqueous solution is in a range of 2 M to 3 M,
   a concentration of the NaOH aqueous solution is in a range of 5 M to 6 M, a concentration of the $Na_2SO_4$ aqueous solution is in a range of 0.5 M to 1 M, and the dried product consists of iron (III) oxide.

2. The method of claim 1, wherein a volume ratio of the ferric chloride aqueous solution:the sodium hydroxide aqueous solution:the sodium sulfate aqueous solution is 10:9:x, where x satisfies 0<x<1.

* * * * *